US011289082B1

(12) United States Patent
Lacy et al.

(10) Patent No.: US 11,289,082 B1
(45) Date of Patent: Mar. 29, 2022

(54) SPEECH PROCESSING OUTPUT PERSONALIZATION

(71) Applicant: Amazon Technologies, Inc., Seattle, WA (US)

(72) Inventors: Andrea Klein Lacy, Mountain View, CA (US); Timothy Whalin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 16/676,888

(22) Filed: Nov. 7, 2019

(51) Int. Cl.
*G10L 13/02* (2013.01)
*G10L 15/22* (2006.01)
*G10L 15/02* (2006.01)

(52) U.S. Cl.
CPC .............. *G10L 15/22* (2013.01); *G10L 13/02* (2013.01); *G10L 15/02* (2013.01); *G10L 2015/225* (2013.01); *G10L 2015/227* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 6,560,576 | B1 * | 5/2003 | Cohen | G06F 3/167 704/270 |
| 7,920,682 | B2 * | 4/2011 | Byrne | H04M 1/645 379/88.18 |
| 2008/0103781 | A1 * | 5/2008 | Wasson | G10L 17/26 704/277 |
| 2008/0154601 | A1 * | 6/2008 | Stifelman | G10L 15/22 704/251 |
| 2014/0081643 | A1 * | 3/2014 | John | G06F 40/20 704/270 |
| 2019/0236204 | A1 * | 8/2019 | Canim | G10L 15/16 |
| 2019/0237068 | A1 * | 8/2019 | Canim | G06F 16/288 |

* cited by examiner

*Primary Examiner* — Jesse S Pullias
(74) *Attorney, Agent, or Firm* — Pierce Atwood LLP

(57) ABSTRACT

Described herein is a system for adapting an output to a user input over a period of time based on how often the user interacts with the system. The system may determine a user's level of familiarity of the system, and may determine to personalize the output to a user request based on his level of familiarity. The user's level of familiarity may be determined by analyzing historical interactions between the user and the system. The level of personalization applied to the output may be determined based on the user's level of familiarity. As user becomes more familiar with the system, the output may be more personalized.

17 Claims, 11 Drawing Sheets

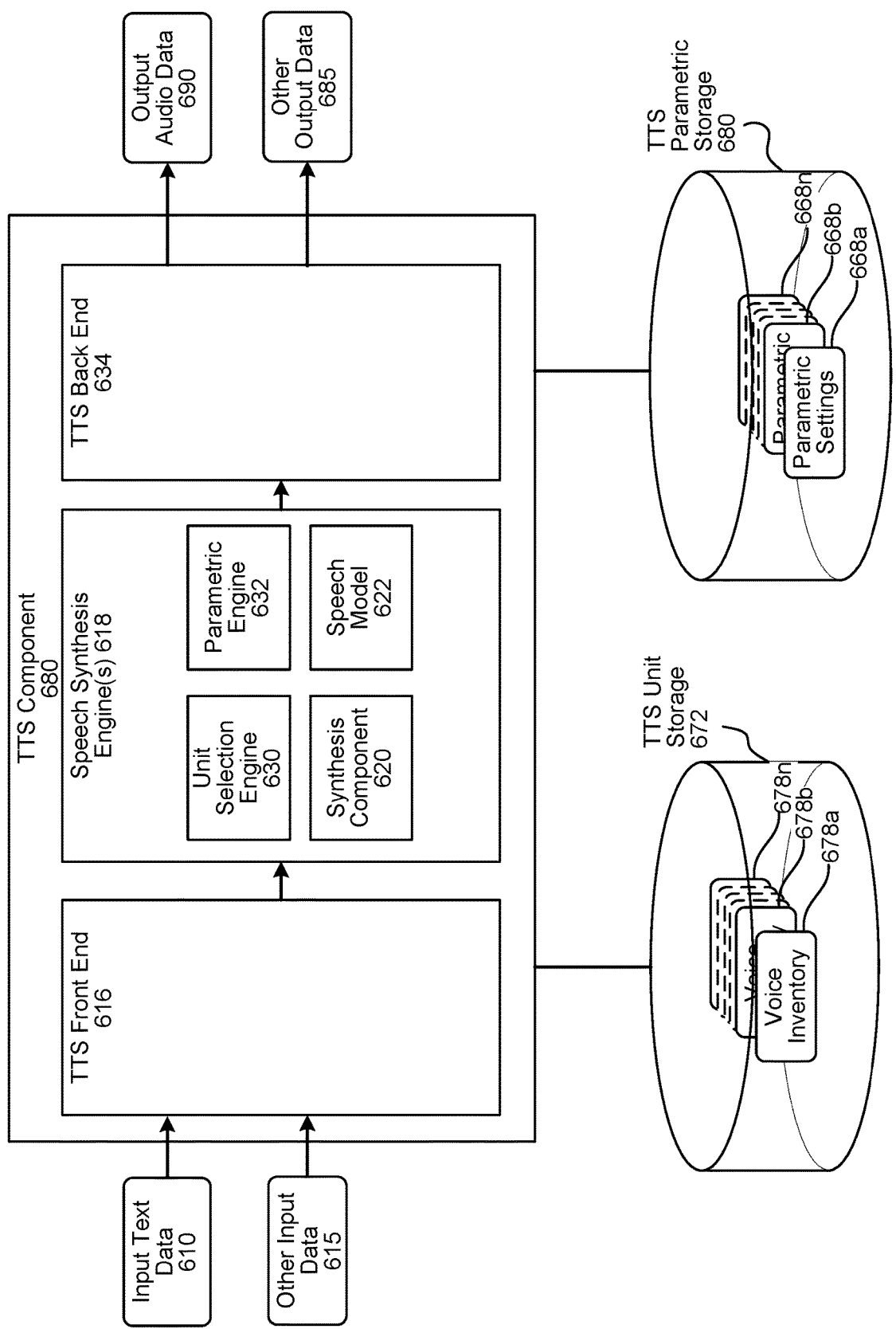

SPEECH PROCESSING OUTPUT PERSONALIZATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding processing techniques, or other techniques or combination thereof used to interpret input audio data is referred to herein as speech processing. Speech processing may also involve converting a user's speech into text data that may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6A is a conceptual diagram of text-to-speech components according to embodiments of the present disclosure.

DETAILED DESCRIPTION

Figure 1:
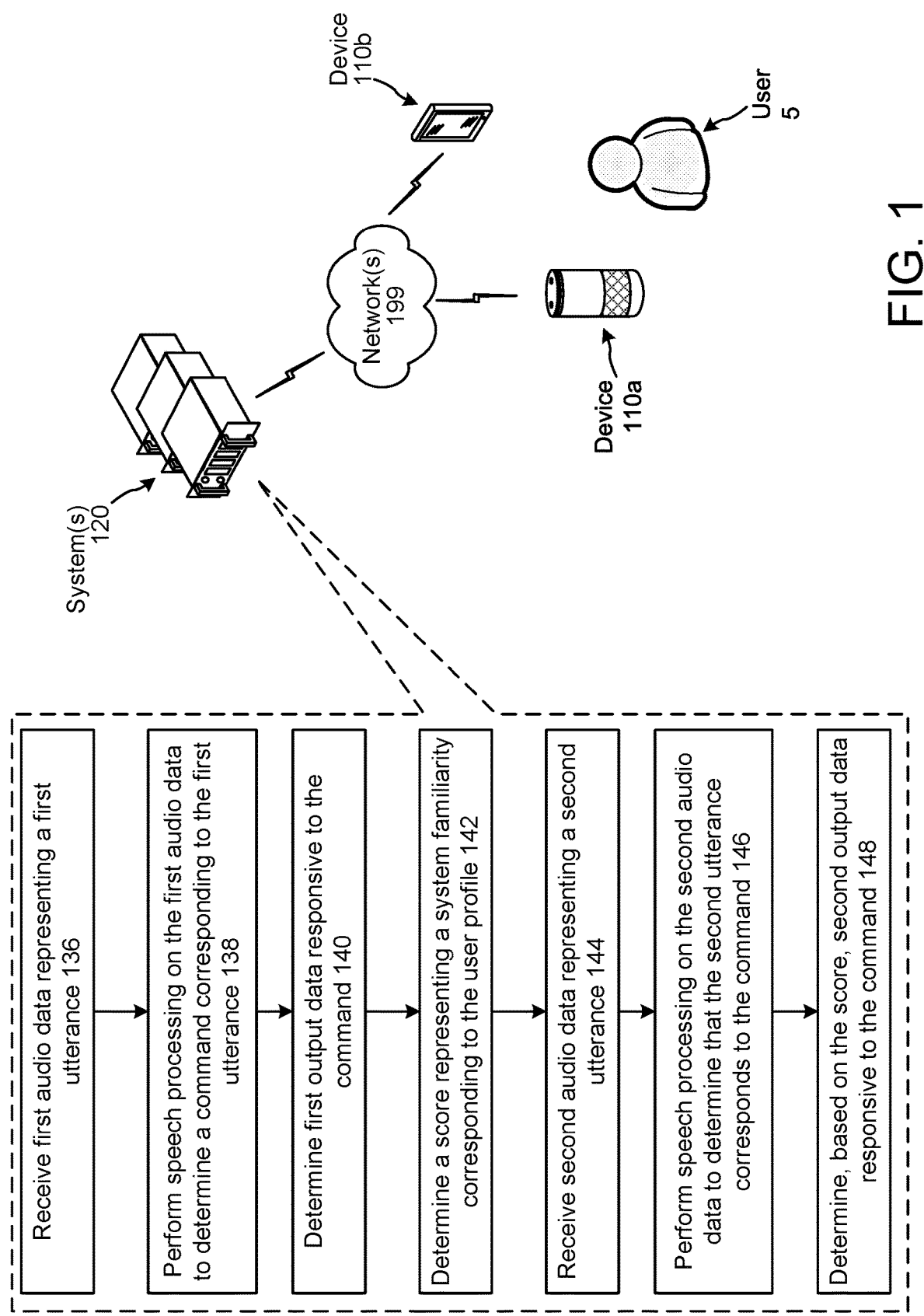
FIG. 1 illustrates a system configured to personalize an output according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user.

The present system may adapt an output to a user request in a sliding scale manner based on data associated with the user. That is, the system may determine a level or type of adaptation for the output based on the user's level of expertise, familiarity, knowledge, understanding or ease in interacting with the system. The system may determine an interaction score indicating the user's level of expertise with the system. The interaction score may range from 0 to 100, where a low number may indicate that the user is a relatively unfamiliar and a higher number may indicate that the user is an expert or otherwise familiar. In an example embodiment, the system may adapt the output in a minimal way (a first level of personalization) when the user's interaction score is above a particular threshold indicating the user is no longer a novice (but is also not an expert yet). As the user's interaction score increases, the system may continue to adapt the output beyond the first level of personalization.

In some embodiments, the system may revert an adaptation of the output based on negative feedback received from the user. For example, if the user indicates that the user did not like the adaptation or that the user prefers the previous output, the system may store the user's preference and stop adapting the output in that manner.

The user's interaction score may decrease based on various factors, for example, if the user does not interact with the system for a number of days, has difficulty interacting with the system in a certain setting or other type of manner, the user appears to have forgotten how to interact with the system in a particular situation, and other factors. Since the output is implemented in a sliding scale manner, the system may "dial down" the application of the functionality (e.g., "dial up" the application of the functionality for new users) when the user's interaction score decreases.

As used herein, using a personalization factor and applying a level of personalization to an output refers to the system determining a second output responsive to the user input that is different than a first output response to the user input, where the first output may be a general and widely-presented output and the second output may be tailored/personalized/customized/adapted based on data related to the user and/or user input. The second output may differ from the first output in terms of content, style, language and/or form, among other things.

FIG. 1 illustrates a system configured to personalize an output according to embodiments of the present disclosure. As illustrated in FIG. 1, the system may include one or more devices (110*a*) local to a user 5, and one or more systems 120 connected across one or more networks 199.

The system(s) 120 may receive (136) first audio data representing a first utterance. The first audio data may represent an utterance spoken by the user 5 and captured by the device 110*a*. Alternatively, the system(s) 120 may receive first text data inputted by the user 5 via the device 110*b*. The first utterance or first text data may be "What is the weather in Chicago?" The system(s) 120 may perform (138) speech processing on the first audio data to determine a command corresponding to the first utterance. The system(s) 120 may process the first audio data using ASR processing to determine text data, and perform NLU using the text data to determine the command corresponding to the first utterance. The system(s) 120 may determine the command based on an intent, a domain/skill/application and other data determined by performing NLU. In the case, where the user 5 inputs first text data, the system(s) 120 may perform NLU on the first text data to determine the command.

The system(s) 120 may determine (140) first output data responsive to the command. The system(s) 120 may receive substantive data from a source (e.g., database(s), skill system(s) 125, or other sources) that can be used to respond to the command/first utterance. The system(s) 120 may determine first descriptive data that can be used to format the substantive data to respond to the command/first utterance. The descriptive data may indicate content, style, persona, language, etc. that can be used to format the substantive data. In other examples, the descriptive data may include an introduction text to the substantive response/data.

The system(s) 120 may generate the first output data by performing TTS processing using the substantive data and the first descriptive data to generate first output audio data representing a synthesized speech response to the first utterance. In this case, the descriptive data may indicate a format that is generally or widely used by the system for multiple users/user profiles. For example, the system(s) 120 may generate first output data that may cause the device 110*a* to output "In Chicago the weather is a high of 56 degrees and a low of 30 degrees with cloudy skies and showers." The substantive data received from the source may be the weather information for Chicago (high=56, low=30, cloudy, showers), and the first descriptive data may be a general format including an introduction to output the weather information (e.g., in <location> the weather is a high of <_> degrees and a low of <_> degrees with <additional weather information>), where the introduction text may be "In <location> the weather is . . . ."

The system(s) 120 may determine (142) a score representing a system familiarity corresponding to the user profile. The score may indicate how familiar or otherwise how comfortable the user 5 is with respect to interacting with and/or using the device 110*a*, the speech processing system described herein, a domain, a skill and/or an application. The score may indicate whether a user is a novice or an expert at interacting with and/or using the device 110*a*, the speech processing system described herein, a domain, a skill and/or an application. In one embodiment, the system(s) 120 may determine the score by determining a number of past utterances spoken by the user 5 within a time period, where the past utterances relate to the command or a particular domain/skill/application. For example, the user may have asked for the weather in Chicago for 9 days over a 2-week period. In another embodiment, the system(s) 120 may determine the score by determining a total number of past utterances spoken by the user 5 since the user first started interacting with the system. The system(s) 120 may process data relating to historical interactions and/or past utterances stored in the user profile associated with the user 5.

In other embodiments, the system(s) 120 may determine the score based on the number of devices 110 the user 5 interacted with, the types of devices 110 the user interacted with, the lag time between the user speaking the wakeword and the command, the types of past commands/interactions, the way the user speaks the command, and other data related to the user. Further details on how the system determines the score (e.g., interaction score) are described below in connection with FIG. 3 and interaction component 310.

In some embodiments, the system(s) 120 may determine multiple scores using various data/signals related to the user and/or the user input, and then may aggregate the scores to determine a single score to use as described herein. The multiple scores may be represented as a vector, a matrix, etc. The scores may be aggregated into a single score by using various methods, such as, summation, average, weighted average, using a machine learning model, etc. The multiple scores may correspond to various information related to the user, such as how familiar is the user with the system, how much does the user trust the system, how comfortable is the user with the system personalizing output, etc. The multiple scores may also represent various information related to the user input (e.g., context signals/data), such as, the number of people around the device 110, NLU scores (system confidence level with respect to the user's intent, system confidence level with respect to the slot value, etc.), ASR scores (system confidence level with respect to understanding what the user said), the number of times the same command has been received from user 5, the time/day the command is received, the location of the device 110/user 5, etc.

In some embodiments, the system(s) 120 may determine a score that indicate the user's familiarity with a particular domain. For example, a first score may indicate the user's familiarity with the music domain (using data related to the user's interactions with the music domain, using data related to other similar users' interactions with the music domain, etc.), a second score may indicate the user's familiarity with the shopping domain (using data related to the user's interactions with the shopping domain, using data related to other similar users' interactions with the shopping domain, etc.), and so on. In some embodiments, the system(s) 120 may determine a score that indicate the user's familiarity with a particular skill. For example, a first score may indicate the user's familiarity with the Amazon Music skill associated with the music domain (using data related to the user's interactions with the Amazon Music skill, using data related to other similar users' interactions with the Amazon Music skill, etc.), a second score may indicate the user's familiarity with the Music B skill associated with the music domain (using data related to the user's interactions with the Music B skill, using data related to other similar users' interactions with the Spotify skill, etc.), and so on.

As can be appreciated a user's familiarity with certain aspects of the system may be determined (and measured, e.g., scored) in a number of different fashions. The system may determine a user familiarity with a particular domain, a particular skill, a particular device, a particular mode of operation (e.g., speech v. text, using the system while traveling, using the system at work, or the like), a particular feature (such as using multiples skills in a same dialog), etc.

The system(s) 120 may receive (144) second audio data representing a second utterance. The second audio data may represent an utterance spoken by the user 5 and captured by the device 110*a*. Alternatively, the system(s) 120 may receive second text data inputted by the user 5 via the device 110*b*. The second utterance may be spoken by the user 5 at a later time than the first utterance, for example, on another day or after a few hours the first utterance was spoken. The system(s) 120 may perform (146) speech processing on the second audio data to determine that the second utterance corresponds to the command. The system(s) 120 may process the second audio data using ASR processing to determine text data, and perform NLU using the text data to determine the command corresponding to the second utterance, and determine that the command corresponding to the second utterance is the same as the command corresponding to the first utterance. In the case, where the user 5 inputs second text data, the system(s) 120 may perform NLU on the second text data to determine the command. For example, the second utterance or second text data may be "What is the weather in Chicago?" or "Tell me the weather in Chicago." In some embodiments, the system(s) 120 may determine that the first utterance and the second utterance correspond to the same domain/skill/application.

The system(s) 120 may determine (148), based on the score, second output data responsive to the command. The system(s) 120 may determine that the score satisfies a condition, exceeds a threshold value, and/or meets a criteria that may indicate that the user's familiarity with the system and/or not a novice at using the system. In response to the score satisfying a condition, the system(s) 120 may determine the second output data. The system(s) 120 may receive substantive data from the source to response to the command/second utterance. The substantive data received from the source this time may be the same or may represent the same type of information as the substantive data received from the source in operation 140. The system(s) 120 may determine second descriptive data to format the substantive data to respond to the command/second utterance. The second descriptive data may be different than the first descriptive, and may be used to personalize/customize/adapt the output to the command/second utterance based on data related to the user. The second descriptive data may include an introduction different than the first descriptive data. The system(s) 120 may determine the second output data using the substantive data and the second descriptive data to personalize the response to the command/second utterance. The second descriptive data may indicate a format that is customized/personalized/adapted for the user 5 based on the score. Thus, the second output data is different than the first output data in terms of format, even though both are responsive to the same command.

The system(s) 120 may generate the second output data by performing TTS processing using the substantive data and the second descriptive data to generate second output audio data representing a synthesized speech response to the second utterance. For example, the system(s) 120 may generate the second output data to cause the device 110a to output "Good morning John, today it is a high of 56, low of 30, with cloudy skies and showers." The substantive data received from the source may be the weather information for Chicago (high=56, low=30, cloudy, showers), and the second descriptive data may be a personalized format and introduction to output the weather information (e.g., Good morning <username>, today it is a high of <_> and a low of <_> with <additional weather information>), where the introduction may include the user's name and may not include the location name. Thus, the second descriptive data may be different than the first descriptive data where the second output includes the user's name (adding pleasantries), includes shorten weather information (removing "degrees"), and does not include the location name.

As part of operation 148, the system(s) 120 may determine how to adapt the output to the command. In some embodiments, the system(s) 120 may determine how to adapt the output using a rule-based system, which may depend on the domain/skill/application corresponding to the user input, the command, the score, the number of times the same command is spoken, etc. For example, for the user's request for weather, if this is the first time the output is adapted then the system may adapt by removing the location name from the output. The second time the output is adapted, the rule may indicate to include additional information in the output. The additional information may be stored with the rule. In other embodiments, the information may be determined by the system(s) 120 using the user request, domain/skill/application, user profile data etc. For example, the additional information may relate to a weather condition that may be abnormal for that location, such as the pollen count or UV index. The system(s) 120 may determine to include such info based on the user profile data indicating that the user may have allergies or likes to use sunscreen or has a scheduled event outdoors. These rules may be stored by the system(s) 120 and may be retrieved to adapt an output.

Figure 2:
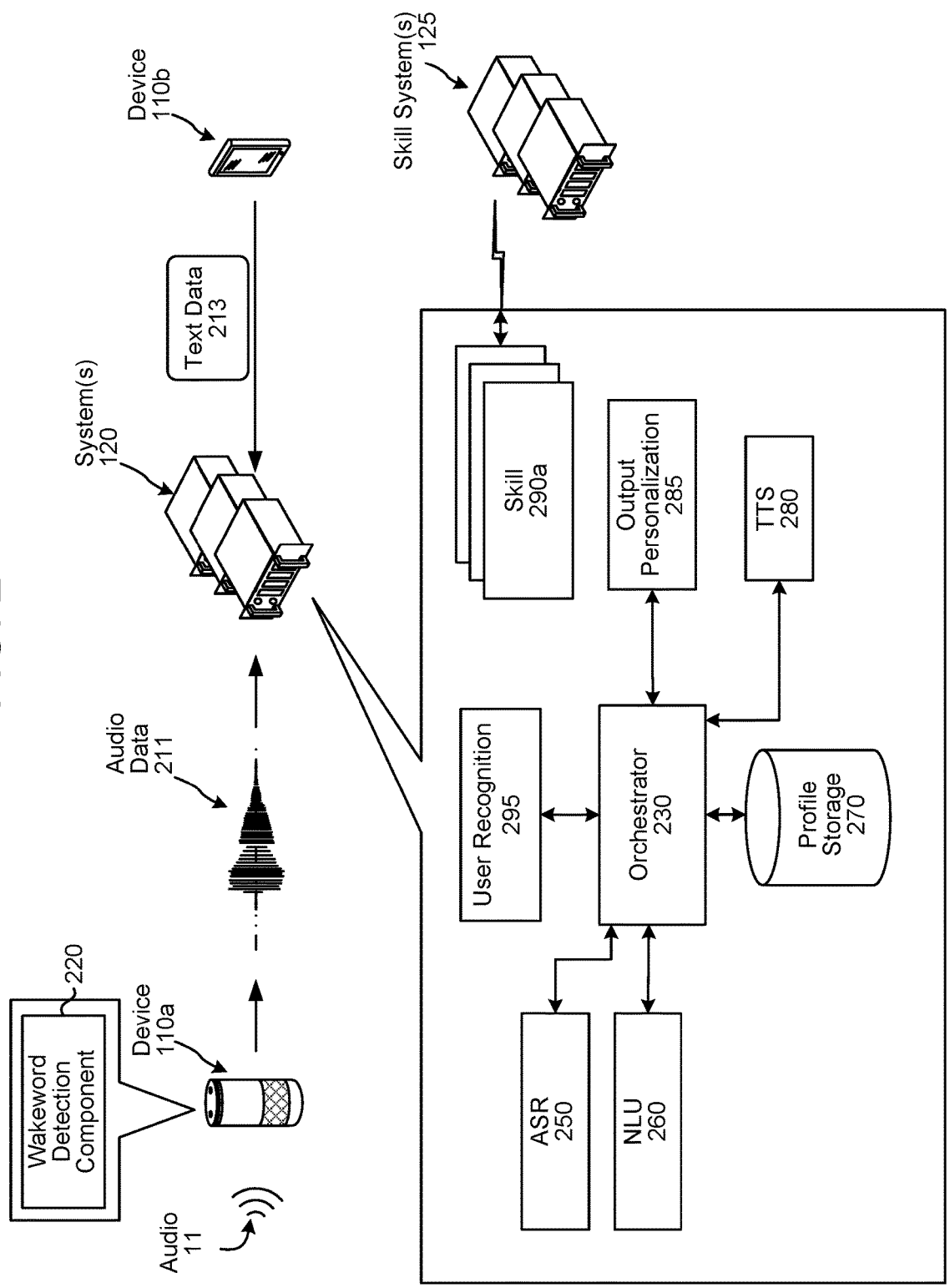
FIG. 2 is a conceptual diagram of components of a system according to embodiments of the present disclosure.

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the system(s) 120. The audio data 211 may include data corresponding to the wakeword, or the device 110a may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a text-based user input. The device 110b may generate text data 213 representing the text-based user input. The device 110a may send the text data 213 to the system(s) 120. The orchestrator component 230 may receive the text data 213.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 125, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 125. Such may enable a skill system(s) 125 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 125.

Unless expressly stated otherwise, reference to a skill, skill device, skill component, or the like herein may include a skill 290 operated by the system(s) 120 and/or skill operated by the skill system(s) 125. Moreover, the functionality described herein as a skill may be referred to using many different terms, such as an action, bot, app, or the like.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
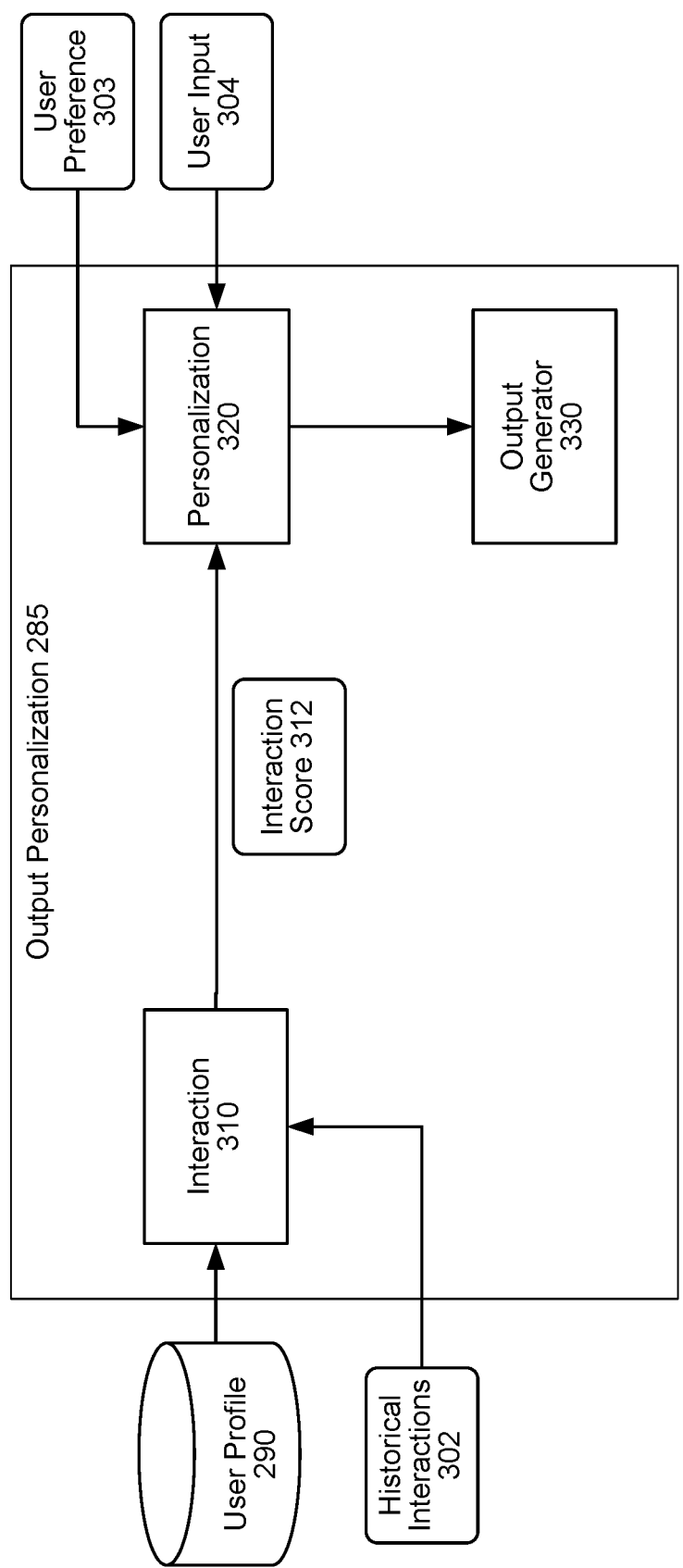
FIG. 3 is a conceptual diagram illustrating components that a system may use to process personalize an output according to embodiments of the present disclosure.
Figure 4:
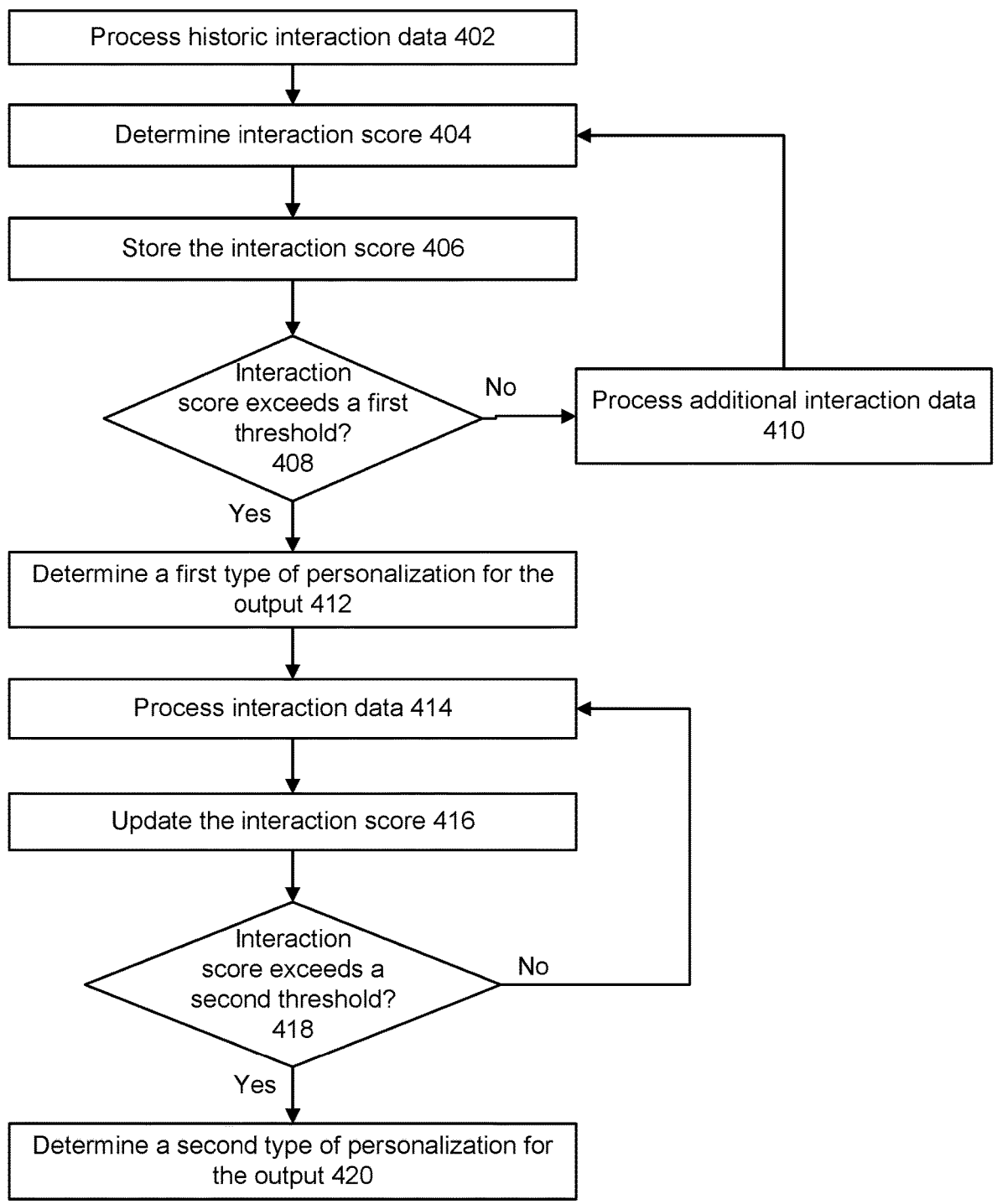
FIG. 4 is a conceptual diagram illustrating how a system adapts an output according to embodiments of the present disclosure.
Figure 5:
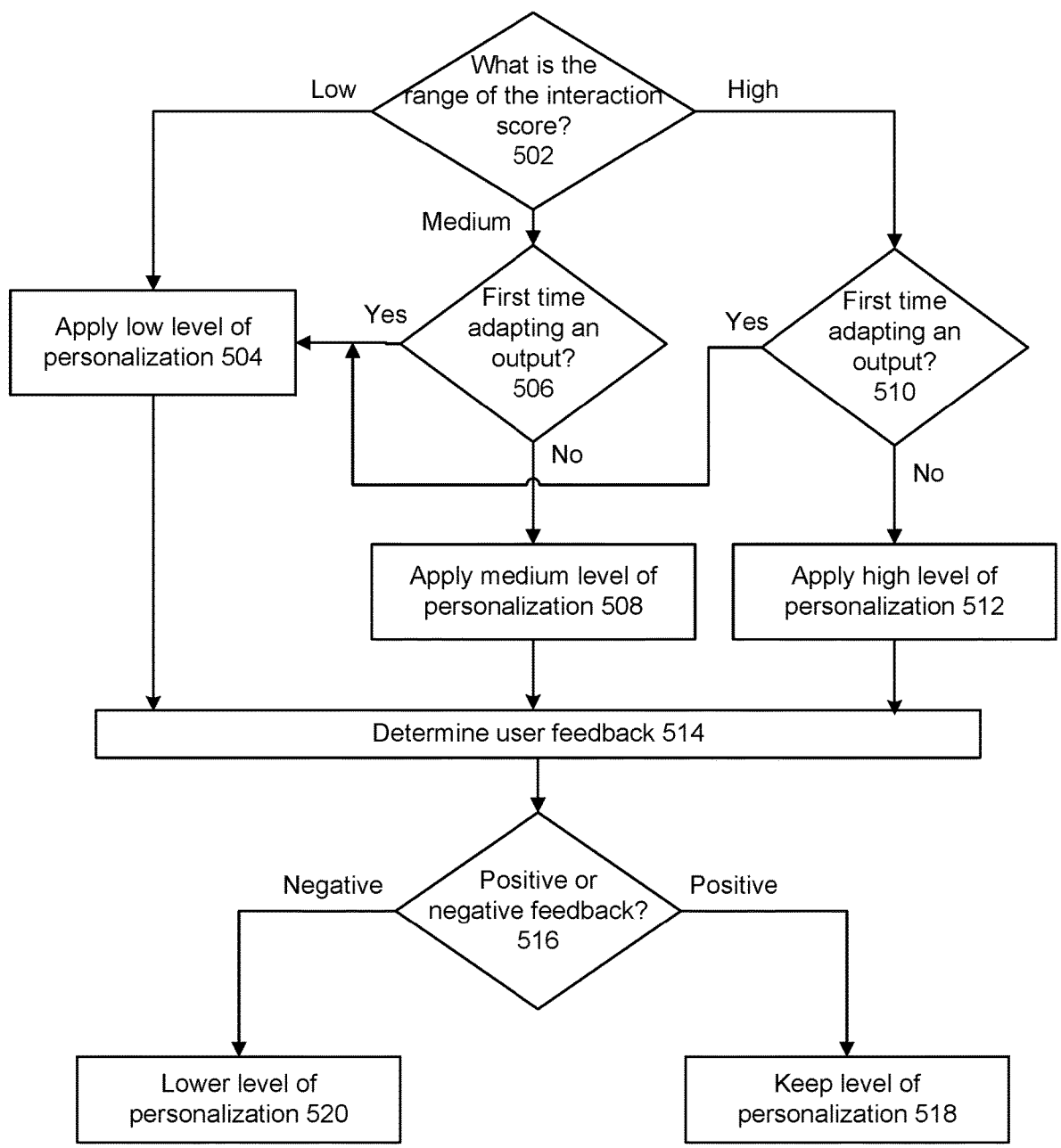
FIG. 5 is a conceptual diagram illustrating how a system applies levels of output personalization according to embodiments of the present disclosure.

FIG. 3 is a conceptual diagram illustrating components that a system may use to process personalize an output according to embodiments of the present disclosure. The output personalization component 285 may include an interaction component 310, a personalization component 320, and an output generation component 330. FIG. 4 is a conceptual diagram illustrating how an output personalization component 285 adapts an output according to embodiments of the present disclosure. FIG. 5 is a conceptual diagram illustrating how an output personalization component 285 applies levels of personalization according to embodiments of the present disclosure. The steps of FIGS. 4 and 5 may be performed by the components illustrated in FIG. 3 as described below.

The interaction component 310 may be configured to determine an interaction score 312 corresponding to a user, where the interaction score may indicate how familiar the user is with respect to interacting with and/or using the device(s) 110 (the user's familiarity with the system/device 110), how comfortable the user is with respect to interacting with and/or using the device(s) 110, how knowledgeable the user is with respect to interacting with and/or using the device(s) 110, how much experience the user has in interacting with and/or using the device(s) 110 and the like. In some cases, the interaction score may indicate whether a user is a novice or an expert at interacting with and/or using the device(s) 110.

In some embodiments, the interaction component 310 may determine an interaction score 312 corresponding to a user with respect to a particular domain, skill and other applications. For example, the interaction score 312a may indicate how knowledgeable the user is with respect to interacting with the weather skill via the device(s) 110, while the interaction score 312b may indicate how knowledgeable the user is with respect to interacting with the SmartHome skill. In some embodiments, the interaction score 312 may relate to a particular command indicating the user's familiarity with using the command.

The interaction component 310 may process (402) historical interactions data 302 corresponding to the user. The interaction component 310 may determine (404) the interaction score 312 based on a number of previous interactions between the user and the device 110. The interaction determination component 310 may determine that a user profile is associated with the input audio data 211 using, as described above, a user recognition component 295. Data associated with the user profile may indicate historical interactions with the device 110, including the utterance spoken by the user, a timestamp indicating when the utterance was received by the system, the domain/skill/application corresponding to the user request/command represented in the utterance, and the like. The interaction component 310 may determine, using the user profile data, a number of total interactions between the user and the device(s) 110, a number of total interactions between the user and a particular skill/domain/application, and the like. The interaction component 310 may analyze the historical interactions to determine the number of similar or same interactions between the user and the device(s) 110. The interaction component 310 may also determine the frequency of the similar or same interactions, that is, how often the user interacts with the device(s) 110 in this manner. For example, the interaction component 310 may determine that the system(s) 120 has received the same request/command from the user for the past four days, or every other day for a week, or twice a day, etc. The higher the number of interactions with the device(s) 110, the higher the interaction score 312, indicating that the user is an expert at interacting with the device(s) 110. If the frequency of a particular interaction/command is higher, then the interaction score 312 with respect to that command may be higher.

The interaction score 312 may be based on a combination/sum/average/weighted average of the number of total interactions between the user and the device(s) 110, the number of total interactions between the user and a particular skill/domain/application, the frequency of interactions, the number of same/similar commands received from the user, and the like. In an example embodiment, the interaction component 310 may employ an algorithm, statistical analysis, machine-learning algorithm or other techniques to process the historical interactions data 302 to determine the interaction score 312.

The interaction component 310 may also determine (404) the interaction score 312 based on the number of devices 110 the user has interacted with and the different types of devices 110 (illustrated in FIG. 10) the user has interacted with. The interaction score 312 may be higher when the number of devices and/or the number of different types of devices is higher, indicating the user may be an expert in interacting with the speech processing system. The number of devices 110 and the different types of devices 110 the user has interacted with may be determined using the user profile data.

The interaction component 310 may determine (404) the interaction score 312 based on the type of interactions the user has with the device(s) 110. The interaction component 312 may analyze the user's historic interactions to determine that the type of user interaction includes some basic commands, such as, playing music, turning on the lights, receive weather information, etc., and may determine that the type of interaction is basic or at a low level. The interaction component 312 may analyze the user's historic interactions to determine that the type of user interaction includes some commands beyond the basic commands, such as, making calls to other similar devices 110 (e.g., drop-in calls), and may determine that the type of interaction is medium level. The interaction component 312 may analyze the user's historic interactions to determine that the type of user interaction includes some high level commands, such as ones that request the system to perform multiple tasks using one user input (e.g., make a restaurant reservation and book a ride to the restaurant), and may determine that the type of interaction is high level. The higher the type of interaction level, the higher the interaction score 312

The interaction component 310 may also determine (404) the interaction score 312 based on the different commands the user has spoken with respect to a domain/skill/application. If the user interacts with a particular domain/skill/application in a variety of ways, then it may indicate that the user is comfortable using that particular domain/skill/application. For example, a user that only asks the device 110 for the weather (invoking the weather skill) may have a lower interaction score 312 with respect to the weather skill, as compared to a user that asks the device 110 for the pollen count, the UV index, etc., invoking the weather skill to output more than just today's weather.

In some embodiments, the interaction component 310 may determine (404) the interaction score 312 based on a lag time between when the user says the wakeword and when the user says the user request/command. That is, the interaction score 312 may be based on the time elapsed between the wakeword and the user request. The time elapsed may be determined by analyzing audio data corresponding to past utterances spoken by the user. The interaction component 310 may analyze more recently spoken past utterances, for example, utterances spoken within the past week or past few days, etc. The higher the amount of time elapsed between the wakeword and the user request, the lower the interaction score 312 may be, and the lower the amount of time elapsed between the wakeword and the user request, the higher the interaction score 312 may be. A novice user may pause after saying the wakeword and before saying the user request to maybe ensure that the device 110 was active to listen to the user request. For example, a novice user may say "Alexa" pause for two seconds, "what is the weather today?" An expert user may not pause between saying the wakeword and the user request. For example, an expert user may say "Alexa what is the weather?"

The interaction component 310 may also analyze how quickly the user speaks the utterance to determine the interaction score 312. For example, a novice user may speak an utterance slowly or carefully to maybe ensure that the device 110 is able to understand what the user is saying. An expert user may speak an utterance quickly because the user may know (from prior interactions) that the device 110 is capable of understanding what he/she is saying.

The interaction component 310 may also analyze past interactions to determine the form of the user request or the manner in which the user speaks the request. The interaction component 310 may determine whether the past user requests were spoken in a formal manner or a casual manner. For example, a novice user may speak a request in a formal manner, such as "what is the weather today?" while an expert user may speak a request in a casual manner, such as "what's the weather?" or "tell me the weather." The interaction component 310 may determine the interaction score 312 based on this analysis, and may also use other data that indicate the user's level of familiarity with the device(s) 110.

In some embodiments, the interaction component 310 may process and analyze historical interactions of other users to determine an interaction score for this user. For example, the output personalization component 285 may determine one or more users that are similar to the instant user with respect to user profile data, user behavior, user demographics, type of interactions with the system, etc. The interaction component 310 may use data (e.g., historical interactions) associated with users that are similar to the instant user to determine/augment/enhance the interaction score 312 associated with the instant user.

The interaction component 310 may store (406) the interaction score 312 and associated it with the user profile of the user. In some embodiments, the interaction component 310 may associate data with the interaction score 312 to indicate what data was the interaction score 312 based on. For example, the data may indicate that the interaction score 312 was based on the total number of interactions between the user and the device(s) 110, or the number of interactions with respect to a particular domain/skill/application. In other examples, the data may indicate generally that the interaction score 312 was based on a number of interactions. The data may indicate that the interaction score 312 was based on the type of interactions, the form of the user input, the type of devices the user has interacted with, the number of devices the user has interacted with, the lag time between the wakeword and the user request, other data related to historical interactions 302, and/or other data related to the user profile 290 that the interaction component 310 used to determine the interaction score 312.

In some embodiments, the interaction component 310 may determine or update the interaction score 312 on a daily basis. For example, the interaction component 310 may update the interaction score 312 once a day based on data relating to the interactions between the user and the device(s) 110 that occur on that day. So, in a non-limiting example, the interaction score 312 may increase every day when the user inputs the same command every day.

In some embodiments, the interaction score 312 may be multiple scores that are determined using the various data/signals related to the user and/or the user input described above. The interaction component 310 may, in some embodiments, aggregate the scores to determine a single score 312. The multiple scores may be represented as a vector, a matrix, etc. The scores may be aggregated into a single score by using various methods, such as, summation, average, weighted average, using a machine learning model, etc. The multiple scores may represent various information related to the user, such as, how familiar is the user with the system, how much does the user trust the system, how comfortable is the user with the system personalizing output, etc. The multiple scores may also represent various information related to the user input (e.g., context signals/data), such as, the number of people around the device 110, NLU scores (system confidence level with respect to the user's intent, system confidence level with respect to the slot value, etc.), ASR scores (system confidence level with respect to understanding what the user said), the number of times the same command has been received from user 5, the time/day the command is received, the location of the device 110/user 5, etc.

Further in some embodiments, the output personalization component 285 may determine various interaction scores representing the user's familiarity with respect to different aspects of the system. For example, one interaction score may represent the user's familiarity with a particular domain/skill, while another interaction score may represent the user's familiarity with another domain/skill. One interaction score may represent the user's familiarity with a particular device type, such as a voice user interface device, while another interaction score may represent the user's familiarity with a screen-based interface device. Other examples of different aspects the interaction score may represent include, but are not limited to, a user's familiarity with peripheral devices, a user's familiarity with multi-user interactions, a user's familiarity with system modes (e.g., guest mode, child mode, privacy mode, etc.), and a user's familiarity with multi-device functionalities (e.g., selection of output device using echo spatial perception, multi-room device arrangements, etc.).

The personalization component 320 may be configured to determine how an output corresponding to a user input can be personalized. The personalization component 320 may process user preference data 303 and user input data 304. The personalization component 320 may determine to personalize the output based on the interaction score 312 corresponding to the user who provided the user input. For example, if the interaction score 312 meets or exceeds a threshold value and/or satisfies a condition(s), the personalization component 320 may determine to personalize an output for the corresponding user. In an example embodiment, the personalization component 320 may identify the user speaking the user request, determine user profile data associated with the user, and determine how to adapt the output based on the user profile data.

The personalization component 320 may adapt the output in with respect to output content, output style, output language, and/or output form (e.g., audio versus visual). The personalization component 320 may adapt the output with respect to the length of the output, the descriptiveness of prompt, volume, addition of information, a persona in which the output is presented, addition of pleasantries, by applying an emotion to the output speech, display density, display layout, selection of device for output, and the like.

The personalization component 320 may determine (408) if the interaction score 312 exceeds a first threshold. If the interaction score does not exceed the first threshold, then the interaction component 310 may process (410) additional interaction data to determine the interaction score. The additional interaction data may include data related to ongoing interactions or interactions that occurred subsequent to operation 402.

If the interaction score 312 meets the first threshold, then the personalization component 320 may determine (412) a first type of personalization to apply to the output. The first threshold may be a value that differentiates between a novice user and a mid-level expert user. That is, the first threshold may be used to identify when a user's interaction score indicates that the user is no longer a novice user. The personalization component 320 may determine how the output should be personalized based on the data associated with the interaction score 312.

The personalization component 320 may personalize or adapt an output from one user to another (e.g., person-specific adaptation) or for a user over time (e.g., context-specific adaptation) to provide a more personalized experience to the user. In a person-specific adaptation, the personalization component 320 may determine to adapt the output based on data related to the user, such as, an age of the user, a role associated with the user (e.g., administrator versus employee, hotel administrator versus hotel guest, etc.), calendar information, historical media playback, user preferences, etc.

In a context-specific adaptation, the personalization component 320 may determine to adapt the output based on data related to the user input that indicates the circumstances or context corresponding to the user input, such as, user location, a location indicated in the user input, the time when the user input is received, a time indicated in the user input, the type of device used to provide the user input, and other data.

The personalization component 320 may determine whether to perform an implicit adaptation (e.g., personalization) with respect to the output or to perform an explicit adaptation (e.g., customization) with respect to the output. The personalization component 320 may perform an implicit adaptation or personalization without the user explicitly choosing it. The personalization component 320 may perform an explicit adaptation or customization may be performed by the system after an explicit instruction, preference selection, or opt-in from the user.

In some embodiments, the personalization component 320 may employ a rule-based system to determine how to adapt an output for a user. In some embodiments, the personalization component 320 may employ a machine-learning model to determine how to adapt an output for a user.

In an example embodiment, the personalization component 320 may determine which device to send the output. For example, a user may have multiple devices 110, as determined using the user profile data and the device identifiers associated with the user profile. The personalization component 320 may determine to send the output to a first device 110a rather than a second device 110b based on various factors, such as, user location, type of output, user preferences, the device related to historic interactions, and the like.

The personalization component 320 may determine (412) a type of change or adaptation to apply to the output. The personalization component 320 may determine the type or change based on the interaction score 312, user profile data, user preferences 303, historical interactions, context data corresponding to the user input 304, and the like.

In some embodiments, the personalization component 320 may process user feedback with respect to the adapted output. For example, the device 110 may present an adapted output responsive to the user input. In some cases, the system may ask the user for feedback with respect to the output. In some cases, the user may provide feedback with respect to the output without the system explicitly prompting the user. The personalization component 320 may process the feedback to determine if the user had a positive experience with respect to the adapted output. If the user indicates that the user had a positive experience, then the system may continue to adapt the output in that manner when responding to subsequent user inputs. If the user indicates that the user had a negative experience, then the system may revert to the original output by un-applying the adaptation or by not sending instructions to the output generator 330 to adapt the output.

In some embodiments, the personalization component 320 may determine a level of personalization to use for the output. After determining to adapt an output, the personalization component 320 may determine which level of personalization should be applied to the output. In an example embodiment, if this is the first time the personalization component 320 is adapting the output as described herein, then the personalization component 320 may apply a first level of personalization. If the adapted output is perceived by the user in a positive manner, then the personalization component 320 may apply a second level of personalization to the output when responding to the same user input. In the first level of personalization, the personalization component 320 may apply one change or adaptation to the output. In the second level of personalization, the personalization component 320 may apply more than one change or adaptation to the output.

The level of personalization may be determined based on the interaction score 312 corresponding to the user. As described herein, the interaction score 312 may indicate a user's familiarity with interacting/using the device(s) 110. The personalization component 320 may determine that a user with a higher interaction score may have a more positive experience with a higher level of personalization as compared to a user with a lower interaction score.

The output personalization component may process (414) further interaction data corresponding to interactions subsequent to the adapted output being presented to the user. The interaction component 310 may update (416) the interaction score 312. The personalization component 320 may determine (418) if the updated interaction score exceeds a second threshold. The second threshold may be a value that differentiates between a mid-level expert user and a highly expert user. That is, the second threshold may be used to identify when a user's interaction score indicates that the user is an expert user. If the interaction score does not exceed the second threshold, the interaction component 310 may continue processing (414) further interaction data. The further interaction data may be data related to interactions that occur subsequent to the operation 418. If the interaction score exceeds the second threshold, then the personalization component 320 may determine (420) a second type of personalization to apply to the output. The second type of personalization may correspond to the interaction score indicating that the user is an expert.

The personalization component 320 may determine to adapt the output to match certain qualities of the user input, such as, the user's accent, user's pronunciations, user's sentiment, user's emotion, etc. For example, the personalization component 320 may indicate to the output generator component 330 that the output, in the case of synthesized speech, should match the user's pronunciations.

The output generator component 330 may be configured to generate a personalized output responsive to the user request. The output generator component 330 may receive data indicating in which manner the output is to be personalized as determined by the personalization component 320. The output generator component 330 may use natural language generation (NLG) techniques. Further details on how the output generator component 330 may generate an output are described with connection to FIGS. 6A and 6B.

Referring to FIG. 5, the personalization component 320 may determine a level of personalization to be applied to an output based on the user's interaction score. The system may apply personalization to an output in a sliding scale manner based on the interaction score. The personalization component 320 may determine (502) the range that the interaction score 312 falls in. In example embodiments, the interaction score may range from 0 to 100. The system may be configured to identify an interaction score between 0-30 as being in the low range, an interaction score between 31-69 may be in the medium range, and an interaction score between 70-100 may be in the high range. The ranges are configurable based on system preferences. If the interaction score 312 is determined to be in the low range, then the personalization component may apply (504) a low level of personalization. The personalization component 320 may only apply the low level of personalization if the interaction score meets another threshold or satisfies another condition.

If the interaction score 312 is determined to be in the medium range, then the personalization component 320 may determine (506) if this would be the first time an output is adapted or personalized for the user. If this is the first time, then the personalization component 320 may apply (504) a low level of personalization to the output. If this is not the first time, then the personalization component 320 may apply (508) a medium level of personalization to the output.

If the interaction score 312 is determined to be in the high range, then the personalization component 320 may determine (510) if this would be the first time an output is adapted or personalized for the user. If this is the first time, then the personalization component 320 may apply (504) a low level of personalization to the output. If this is not the first time, then the personalization component 320 may apply (512) a high level of personalization to the output.

The personalization component 320 may determine (514) user feedback corresponding to the adapted or personalized output. The personalization component 320 may receive data relating to a user response to the adapted output. For example, the ASR component 250 and NLU component 260 may process user input to determine what the user said, and the orchestrator 230 may send the data related to the user input to the personalization component 320. In some embodiments, the system may output a prompt requesting explicit feedback with respect to the adapted output.

The personalization component 320 may also determine (514) user feedback based on lack of engagement or response from the user in response to the adapted output. The personalization component 320 may also determine user feedback based on the user interrupting (canceling task, etc.) when the system is providing the output. The personalization component 320 may also determine user feedback using sentiment detection with respect to a user's response to the adapted output, facial/emotion recognition or classification to determine a user's reaction to the adapted output, or other techniques to determine a user's response/reaction to the adapted output.

The personalization component 320 may determine (516) if the user feedback with respect to the adapted output is positive or negative. If the user feedback is positive, then the personalization component 320 may determine (518) to keep the level of personalization. If the user feedback is negative, then the personalization component 320 may determine (520) to lower the level of personalization. For example, if a medium level of personalization was applied, then the personalization component 320, in response to negative feedback, may apply a low level of personalization to the output for a subsequent user request. If a low level of personalization was applied, then the personalization component 320, in response to the negative feedback, may apply no personalization to the output for a subsequent user request.

In a non-limiting example, the output personalization component 285 may personalize or adapt the output to the user input "Alexa, what's the weather in Chicago?" over time. The user may ask the system for the weather for a few days in a row, example, days 1 through 10. On day 1, the system may output "Currently in Chicago, it's 56 degrees with showers and partly cloudy skies." This output may represent an un-adapted or otherwise non-personalized output to the user request. On day 4, the system may output in response to the user request: "It's 56 degrees with showers and partly cloudy skies." This output may represent an adapted output where the city name is omitted from the output. The output personalization component 285 may determine to personalize the output on day 4 based on the interaction score 312 associated with the user. In this case, the interaction component 310 may determine the interaction score 312 to be high with respect to the particular command (relating to weather) because the user input related to the same command for multiple days in a row. The personalization component 320 may determine to omit a portion of the output, such as the location name, based on the location of the device 110 being the same on the four days and the user providing the same input. Thus, the personalization component 320 may determine to shorten the output. Such adaptation of an output may be a first level of personalization.

Continuing with the non-limiting example, on day 5 the system may output "It's 56 degrees with showers and partly cloudy skies" to the user request for weather. After the output, the user may provide a follow-up user input, for example the user may say "What's the UV Index?" The system may output "It's a max alert today. The UV is 7.5." The output personalization component 285 may determine to output a follow-up prompt "When you ask for the weather, would you like me to let you know when the UV index is high?" The output personalization component 285 may determine to output such a follow-up prompt based on the interaction score 312 associated with the user, where the interaction score 312 is high because the user has inputted the same command for five days in a row. The interaction score 312 may also be high because the user did not provide any negative feedback with respect to the prior adaptation of shortening the output (by omitting the location name). Based on the interaction score 312, the output personalization component 285 may determine that the user is familiar or comfortable with using the device 110, in particular, the weather application, and may determine to apply a second level of personalization by outputting a follow-up prompt. If the user responds "yes" to the follow-up prompt, the system may store data indicating this preference in the user profile storage 290 corresponding to the user.

On day 9 the system may output in response to the user request for the weather: "It's 56 degrees with showers and partly cloudy skies. The UV index is high at 7.5. By the way, the pollen is high today." The output personalization component 285 may determine to output additional information, such as information relating to pollen. The personalization component 320 may determine to adapt the output in this manner based on the interaction score 312 being high. The interaction score 312 may be high based on the user asking for the weather for nine days (in a row or during a period of time, e.g., nine days during a 2 week period). The personalization component 320 may determine to adapt the output by adding information related to the output or the user request. This type of personalization may be a third level of personalization. In this manner, the output personalization component 285 may continue adapting the output over time when the interaction score for the user satisfies a condition.

On day 10, the user may say "what's the pollen count?" The system may output "It is fine today" and may then output a follow-up prompt: "Do you want me to let you know whenever pollens counts are high?" The output personalization component 285 may determine to output the follow-up prompt based on the interaction score 312 being high based on the user interacting with the weather application for ten days in a row.

In another non-limiting example, the output personalization component 285 may personalize or adapt the output to the user input "Alexa, what's the weather in Chicago?" over time in the following manner. On day 1, the system may output "Currently in Chicago, it's 56 degrees with showers and partly cloudy skies." This output may represent an un-adapted or otherwise non-personalized output to the user request. On day 4, the system may adapt the output by shortening the output: "It's 56 degrees with showers and partly cloudy skies," where the city name is omitted from the output.

On day 7, the system may output: "It's 56 degrees with showers and partly cloudy skies. It's just a bit warmer than yesterday." Thus, the personalization component 320 may determine to adapt the output by adding information related to the output or the user request. The system may then output a follow-up prompt: "If you want, I can let you know when it's warmer or colder than yesterday when you ask for the weather. Would you like that?" Thus, the output personalization component 285 may prompt the user to provide feedback regarding the adapted output and/or prompt the user to indicate a preference. If the user responds "yes" then the system may store data indicating the preference in the user profile storage 290. The interaction component 310 may also increase the interaction score 312 based on the user responding positively to the system's adapted output.

On day 10, the system may output in response to the user request for weather: "It's 56 degrees with showers and partly cloudy skies. Looks like it is a bit warmer and wetter than yesterday. You may want to bring an umbrella." Thus, the personalization component 320 may determine to adapt the output by adding information relating to fashion, which may be associated with a domain/skill/application different than the one corresponding to the user request for weather. The personalization component 320 may determine to adapt the output in this manner if the interaction score is high and exceeds a threshold value. In some cases, the user may respond to the adapted output negatively (e.g., "ugh,"

"Alexa, don't give me clothing suggestions," etc.) The personalization component 320 may process the user's response and determine to revert the adaptation of the output when responding to subsequent user requests. The user preference of not receiving clothing suggestions may be stored in the user profile storage 290.

On the Nth day, when the interaction score 312 indicates the user is an expert at interacting with the weather skill (the interaction score exceeds a threshold value), the system may output a prompt offering a shorter version of the weather report: "By the way, I have a shorter, simpler version of the weather that some people really like. Do you want to give it a try?" If the user says "yes" then the system may output a shorter and/or simpler version of the weather output: "Looks like it's colder than yesterday. You probably want to wear a heavy coat because the high today is 10 degrees." The system may then output a prompt asking the user for feedback: "Did you like the shorter version of the weather?" If the user responds "yes" then the system may store the preference in the user profile storage 290, and may adapt the output to subsequent user requests for weather by outputting the shorter version of the weather.

On some N+1 day, when the interaction score 312 exceeds another threshold value, the system may adapt the output in various other ways. In one case, the personalization component 320 may determine to adapt the output by adding the user's name to the output. For example, the output may begin with: "Hi John, looks like it is way colder than yesterday . . . ." The personalization component 320 may add the user's name to the output if this was the user's first interaction with the device 110 in a given period of time (e.g., 24 hours, 12 hours, 6 hours) or it was the user's first interaction of the day with the device 110. In another case, the personalization component 320 may ask the user, after the output, if the user would like additional information related to, for example, another location, another event, another time, etc. than the location/event/time etc. in the user's initial request. For example, the user may have requested today's weather for Chicago. The personalization component 320 may determine to adapt the output to ask the user if the user would like to hear the weather for another location, where the system determines the other location based on user profile data. The personalization component 320 may process user profile data, including calendar data associated with the user, and determine that the user's calendar includes a scheduled event, trip, etc. In this case, the personalization component 320 may output: "It is much colder than yesterday with a high of 10 degrees. <pause> Want to hear the weather for your trip to Seattle?"

In another case, the personalization component 320 may process historic interactions and determine that the user often first requests the weather for a first location, and after the system outputs the weather, the user then requests the weather for a second location. For example, a user may want to know the weather for a location different than the user's location because the user may have family, friends or other interests associated with the location. A historic interaction for this case may be as follows. The user says "What is the weather in Chicago?" The system outputs "It is a high of 56 degrees and a low of 30 degrees today." The user then says "What is the weather in Seattle?" The system outputs "It is a high of 60 degrees and low of 40 degrees today." The personalization component 320 may process this historic interaction, and when the user's interaction score 312 exceeds a particular threshold, the personalization component 320 may determine to adapt the output based on the historic interaction of the user requesting information for a first location and then a second location. For example, the adapted output interaction may be as follows. The user says "What is the weather in Chicago?" The system outputs "It is a high of 56 degrees and a low of 30 degrees today." Would you like to hear the weather in Seattle?" Thus, the system would offer to output the weather of the other location based on historic interactions with the system and the interaction score 312 exceeding a threshold.

The personalization component 320 may be configured to determine other manners in which the output can be personalized. In one embodiment, the personalization component 320 may determine that the user is of a certain age, for example, a child. The personalization component 320 may use this information to adapt the output to generate an output that may correspond to a child. For example, if a child asks for the weather, the system may output: "It is raining cats and dogs today."

In another embodiment, the personalization component 320 may determine to adapt the output by changing the voice that the output is spoken. The personalization component 320 may send data to the output generator 330 indicating selection of a persona to apply to the TTS output. For example, the system output the speech in a male's voice instead of a female's voice. In another example, the system may output the speech in a British accent. In yet another example, the system may output the speech using a celebrity's voice. The output generator 330 may instruct the TTS component 280 to output the speech using a particular persona.

In another embodiment, the personalization component 320 may determine to adapt the output by selecting a particular device to send the output. For example, the user may interact with a device 110a located in the user's home for scheduling events or reminders in the calendar. When a calendar notification is generated, the personalization component 320 may determine that the user is in his car and proximate to device 110b, and may send the notification to the device 110b.

The personalization component 320, in another embodiment, may determine to adapt the output by providing additional information related to a geographic region or location corresponding to the user. The personalization component 320 may also adapt the output by providing information related to a particular time and/or day. For example, the personalization component 320 may determine to provide a weather alert (e.g., flood warning, blizzard warning, heat wave warnings, etc.) associated with the geographic region that the user is in addition to the day's weather. As another example, the personalization component 320 may determine that it is Friday, and may adapt the output to include the upcoming weekend's weather in addition to the day's weather.

In one embodiment, the personalization component 320 may determine to adapt the output by including a pleasantry, a phatic injection, an interjection, etc. In another embodiment, the personalization component 320 may determine to adapt the output by emphasizing one or more words in the output. For example, the system may output: "Good morning! Today's weather is a high of 80 degrees. Enjoy the lovely day!" The personalization component 320 may determine to adapt the output by adding a sentiment or emotion to the output speech. For example, the system may output "It is cold and rain showers all day <in a sad voice>."

In another embodiment, the personalization component 320 may determine to adapt the output by including information related to an interest of the user. The personalization component 320 may process user profile data and/or historic interactions data to determine an interest graph representing the user's areas of interests, a level of interest in the particular area and other data related the areas of interests. For example, the interest graph may indicate that the user is interested in traveling, surfing and/or skiing. In a non-limiting example, when the user asks the system for the weather, the personalization component 320 may adapt the output to include weather information relevant to for surfing and/or skiing. The personalization component 320 may process the user's calendar data to determine that the user has a scheduled ski trip, and may provide weather information for the location associated with the ski trip and weather conditions relevant for skiing.

The personalization component 320 may determine to adapt the output by determining the output form or type of output, such as, audio output, visual output, etc. The personalization component 320 may also select the device with the appropriate capabilities to send the output.

In another embodiment, the personalization component 320 may determine to adapt the output by determining to present the output in a particular language. For example, a user may ask for the weather in Spanish, and the system may output the weather in Spanish.

Components of a system that may be used to perform unit selection, parametric TTS processing, and/or model-based audio synthesis are shown in FIG. 6A. As shown in FIG. 6A, the TTS component/processor 680 may include a TTS front end 616, a speech synthesis engine 618, TTS unit storage 672, TTS parametric storage 680, and a TTS back end 634. The TTS unit storage 672 may include, among other things, voice inventories 678a-288n that may include pre-recorded audio segments (called units) to be used by the unit selection engine 630 when performing unit selection synthesis as described below. The TTS parametric storage 680 may include, among other things, parametric settings 668a-268n that may be used by the parametric synthesis engine 632 when performing parametric synthesis as described below. A particular set of parametric settings 668 may correspond to a particular voice profile (e.g., whispered speech, excited speech, etc.).

In various embodiments of the present disclosure, model-based synthesis of audio data may be performed using by a speech model 622 and a TTS front-end 616. The TTS front-end 616 may be the same as front ends used in traditional unit selection or parametric systems. In other embodiments, some or all of the components of the TTS front end 616 are based on other trained models. The present disclosure is not, however, limited to any particular type of TTS front end 616. The speech model 622 may be used to synthesize speech without requiring the TTS unit storage 672 or the TTS parametric storage 680, as described in greater detail below.

The TTS front end 616 transforms input text data 610 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 618. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 610, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 616 may also process other input data 615, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 610 and/or the text for a TTS request may be accompanied by separate metadata indicating what text should be whispered (or have some other indicated audio characteristic). The speech synthesis engine 618 may compare the annotated phonetic units models and information stored in the TTS unit storage 672 and/or TTS parametric storage 680 for converting the input text into speech. The TTS front end 616 and speech synthesis engine 618 may include their own controller(s)/processor(s) and memory or they may use the controller/processor and memory of the server 120, device 110, or other device, for example. Similarly, the instructions for operating the TTS front end 616 and speech synthesis engine 618 may be located within the TTS component 680, within the memory and/or storage of the server 120, device 110, or within an external device.

Text data 610 input into the TTS component 680 may be sent to the TTS front end 616 for processing. The front-end may include components for performing text normalization, linguistic analysis, linguistic prosody generation, or other such components. During text normalization, the TTS front end 616 may first process the text input and generate standard text, converting such things as numbers, abbreviations (such as Apt., St., etc.), symbols ($, %, etc.) into the equivalent of written out words.

During linguistic analysis, the TTS front end 616 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 680 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 672. The linguistic analysis performed by the TTS front end 616 may also identify different grammatical components such as prefixes, suffixes, phrases, punctuation, syntactic boundaries, or the like. Such grammatical components may be used by the TTS component 680 to craft a natural-sounding audio waveform output. The language dictionary may also include letter-to-sound rules and other tools that may be used to pronounce previously unidentified words or letter combinations that may be encountered by the TTS component 680. Generally, the more information included in the language dictionary, the higher quality the speech output.

Based on the linguistic analysis the TTS front end 616 may then perform linguistic prosody generation where the phonetic units are annotated with desired prosodic characteristics, also called acoustic features, which indicate how the desired phonetic units are to be pronounced in the eventual output speech. During this stage the TTS front end 616 may consider and incorporate any prosodic annotations that accompanied the text input to the TTS component 680. Such acoustic features may include syllable-level features, word-level features, emotion, speaker, accent, language, pitch, energy, duration, and the like. Application of acoustic features may be based on prosodic models available to the TTS component 680. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 616, which may be referred to as a symbolic linguistic representation, may include a sequence of phonetic units annotated with prosodic characteristics. This symbolic linguistic representation may be sent to the speech synthesis engine 618, which may also be known as a synthesizer, for conversion into an audio waveform of speech for output to an audio output device and eventually to a user. The speech synthesis engine 618 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 618 may perform speech synthesis using one or more different methods. In one method of synthesis called unit selection, described further below, a unit selection engine 630 matches the symbolic linguistic representation created by the TTS front end 616 against a database of recorded speech, such as a database (e.g., TTS unit storage 672) storing information regarding one or more voice corpuses (e.g., voice inventories 678*a-n*). Each voice inventory may correspond to various segments of audio that was recorded by a speaking human, such as a voice actor, where the segments are stored in an individual inventory 678 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 630 may then use the information about each unit to select units to be joined together to form the speech output.

The unit selection engine 630 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 620) to form output audio data 690 representing synthesized speech. Using all the information in the unit database, a unit selection engine 630 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 632, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 620) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 680 may be configured to perform TTS processing in multiple languages. For each language, the TTS component 680 may include specially configured data, instructions and/or components to synthesize speech in the desired language(s). To improve performance, the TTS component 680 may revise/update the contents of the TTS storage 680 based on feedback of the results of TTS processing, thus enabling the TTS component 680 to improve speech recognition.

The TTS storage component 680 may be customized for an individual user based on his/her individualized desired speech output. In particular, the speech unit stored in a unit database may be taken from input audio data of the user speaking. For example, to create the customized speech output of the system, the system may be configured with multiple voice inventories 678*a*-278*n*, where each unit database is configured with a different "voice" to match desired speech qualities. Such voice inventories may also be linked to user accounts. The voice selected by the TTS component 680 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 678 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 668) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 630 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 630. As part of unit selection, the unit selection engine 630 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 672 or in another storage component. For example, different unit selection databases may be stored in TTS unit storage 672. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 618 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 680 may include an acoustic model, or other models, which may convert a symbolic linguistic representation into a synthetic acoustic waveform of the text input based on audio signal manipulation. The acoustic model includes rules which may be used by the parametric synthesis engine 632 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 616.

The parametric synthesis engine 632 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 618, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 632 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 632 may lead to a number of potential audio output sequences. Based on the acoustic model and other potential models, the potential audio output sequences may be scored according to a confidence level of the parametric synthesis engine 632. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 668, which may represent acoustic settings matching a particular parametric "voice", may be used by the synthesis component 622 to ultimately create the output audio data 690.

When performing unit selection, after a unit is selected by the unit selection engine 630, the audio data corresponding to the unit may be passed to the synthesis component 620. The synthesis component 620 may then process the audio data of the unit to create modified audio data where the modified audio data reflects a desired audio quality. The synthesis component 620 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 680. For each unit that corresponds to the selected portion, the synthesis component 620 may process the audio data for that unit to create a modified unit audio data. The modified unit audio data may then be concatenated to form the output audio data 690. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 680. In that case, other output data 685 may be output along with the output audio data 690 so that an ultimate playback device (e.g., device 110) receives instructions for playback that can assist in creating the desired output audio. Thus, the other output data 685 may include instructions or other data indicating playback device settings (such as volume, playback rate, etc.) or other data indicating how output audio data including synthesized speech should be output. For example, for whispered speech, the output audio data 690 may include other output data 685 that may include a prosody tag or other indicator that instructs the device 110 to slow down the playback of the output audio data 690, thus making the ultimate audio sound more like whispered speech, which is typically slower than normal speech. In another example, the other output data 685 may include a volume tag that instructs the device 110 to output the speech at a volume level less than a current volume setting of the device 110, thus improving the quiet whisper effect.

In some embodiments, the TTS component 680 may retrain/update/configure one or more components shown in FIG. 6A using data related to user interactions (present and historical) with the system. The system may be configured to process user inputs to determine the user's accents, pronunciations, sentiment, emotion, etc. and the TTS component 680 may be configured to synthesize speech accordingly. For example, if the user pronounces a word in a particular manner, then the TTS component 680 may generate synthesized speech such that the word is pronounced in the same manner as the user's pronunciation. The TTS component 680 may consider the user's geographic location to determine pronunciations and accents corresponding to population of the geographic location.

Figure 6B:
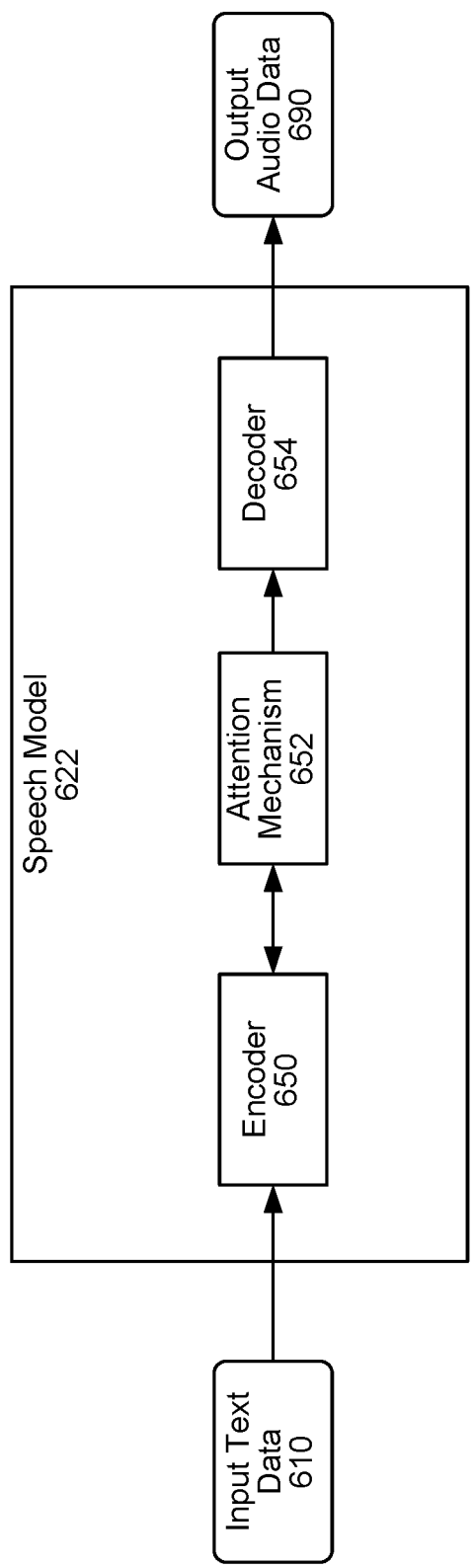
FIG. 6B is a conceptual diagram of a speech model according to embodiments of the present disclosure.

FIG. 6B illustrates an embodiment of the speech model 622. The speech model may include an encoder 650, attention mechanism 652, and a decoder 654. This arrangement of components may be referred to as a sequence-to-sequence model. The encoder 650 and/or decoder 654 may be neural networks having one or more layers. These layers may consist of one or more nodes; each node may receive input data or the output of a node from a previous layer and process that data in accordance with one or more model weights. For example, a node may multiply a value of an input with a model weight to produce an output. The neural networks may be deep neural networks (DNNs), convolutional neural networks (CNNs), and/or recurrent neural networks (RNNs). The neural networks may be trained using training data, such as recordings of utterances and corresponding text.

The encoder 650 may receive input text data 610 (determined by the ASR component 250) corresponding to the user request/utterance from the device 110. The encoder 650 may encode this information into a context vector, which is input to the decoder 654. Optionally, an attention mechanism 652 may receive this context vector as well as outputs of other nodes of the encoder 650 and weight (e.g., "attend") different outputs of the encoder 650 differently. The decoder 654 may then generate output audio data 690 (which may include the response data) using the context vector and/or output of the attention mechanism 652.

Figure 7:
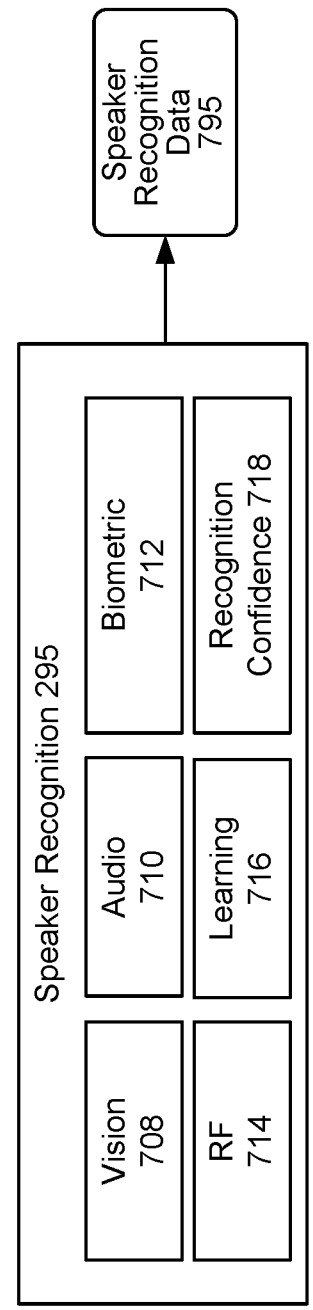
FIG. 7 is a conceptual diagram of a user recognition according to embodiments of the present disclosure.

As illustrated in FIG. 7, the user-recognition component 295 may include one or more subcomponents including a vision component 708, an audio component 710, a biometric component 712, a radio-frequency (RF) component 814, a learning component 716, and a recognition confidence component 718. In some instances, the user-recognition component 295 may monitor data and determinations from one or more subcomponents to determine an identity of one or more users associated with data input to the system. The user-recognition component 295 may output user-recognition data 795, which may include a user identifier associated with a user the system believes is originating data input to the system. The user-recognition data 795 may be used to inform processes performed by the orchestrator 240 (or a subcomponent thereof) as described below.

The vision component 708 may receive data from one or more sensors capable of providing images (e.g., cameras) or sensors indicating motion (e.g., motion sensors). The vision component 708 can perform facial recognition or image analysis to determine an identity of a user and to associate that identity with a user profile associated with the user. In some instances, when a user is facing a camera, the vision component 708 may perform facial recognition and identify the user with a high degree of confidence. In other instances, the vision component 708 may have a low degree of confidence of an identity of a user, and the user-recognition component 295 may utilize determinations from additional components to determine an identity of a user. The vision component 708 can be used in conjunction with other components to determine an identity of a user. For example, the user-recognition component 295 may use data from the vision component 708 with data from the audio component 710 to identify what user's face appears to be speaking at the same time audio is captured by the local device 110 for purposes of identifying a user who spoke an input to the local device 110.

The local device 110 may include biometric sensors that transmit data to the biometric component 712. For example, the biometric component 712 may receive data corresponding to fingerprints, iris or retina scans, thermal scans, weights of users, a size of a user, pressure (e.g., within floor sensors), etc., and may determine a biometric profile corresponding to a user. The biometric component 712 may distinguish between a user and sound from a television, for example. Thus, the biometric component 712 may incorporate biometric information into a confidence level for determining an identity of a user.

The RF component 814 may use RF localization to track devices that a user may carry or wear. For example, a user may be associated with a device. The device may emit RF signals (e.g., Wi-Fi, Bluetooth®, etc.). The local device 110 may detect the signal and indicate to the RF component 814 the strength of the signal (e.g., as a received signal strength indication (RSSI)). The RF component 814 may use the RSSI to determine an identity of a user (with an associated confidence level). In some instances, the RF component 814 may determine that a received RF signal is associated with a mobile device that is associated with a particular user identifier.

In some instances, the local device 110 may include some RF or other detection processing capabilities so that a user who speaks an input may scan, tap, or otherwise acknowledge his/her personal device to the local device 110. In this manner, the user may "register" with the local device 110 for purposes of the local device 110 determining who spoke a particular input. Such a registration may occur prior to, during, or after speaking of an input.

The learning component 716 may track the behavior of various users as a factor in determining a confidence level of the identity of the user. For example, a user may adhere to a regular schedule such that the user is at a first location during the day (e.g., at work or at school). In this example, the learning component 716 factors in past behavior and/or trends into determining the identity of the user that provided input to the local device 110. Thus, the learning component 716 may use historical data and/or usage patterns over time to increase or decrease a confidence level of an identity of a user.

In some instances, the recognition confidence component 718 receives determinations from the various components 708, 710, 712, 814, and 716, and may determine a final confidence level associated with the identity of a user. The confidence level or other score data may be included in the user-recognition data 795.

The audio component 710 may receive data from one or more sensors capable of providing an audio signal (e.g., one or more microphones) to facilitate recognizing a user. The audio component 710 may perform audio recognition on an audio signal to determine an identity of the user and associated user identifier. In some instances, the audio component 710 may perform voice recognition to determine an identity of a user.

The audio component 710 may also perform user identification based on audio received by the local device 110. The audio component 710 may determine scores indicating whether speech in the audio originated from particular users. For example, a first score may indicate a likelihood that speech in the audio originated from a first user associated with a first user identifier, a second score may indicate a likelihood that speech in the audio originated from a second user associated with a second user identifier, etc. The audio component 710 may perform user recognition by comparing audio characteristics representing the audio to stored audio characteristics of users.

Figure 8:
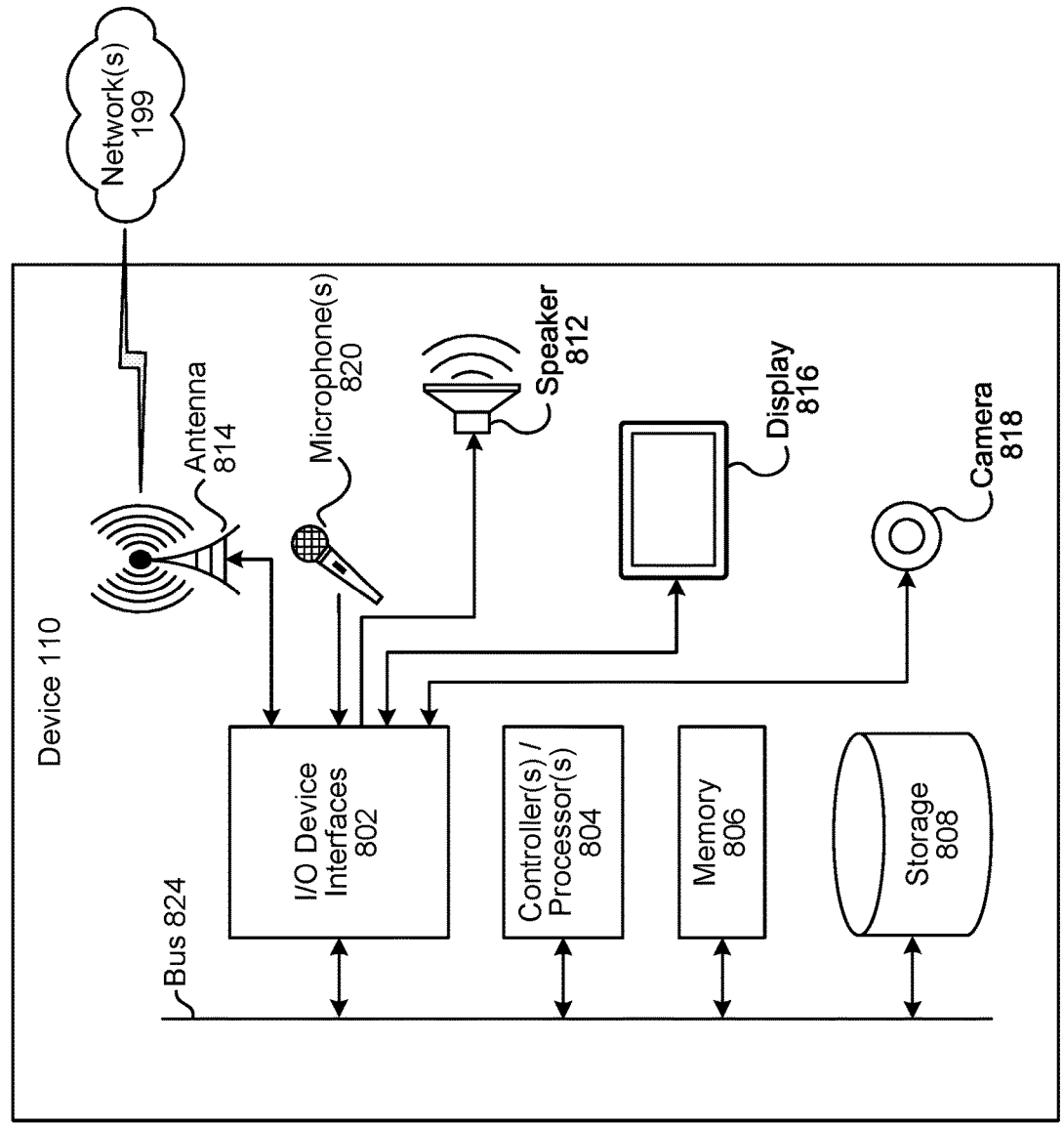
FIG. 8 is a block diagram conceptually illustrating example components of a device according to embodiments of the present disclosure.
Figure 9:
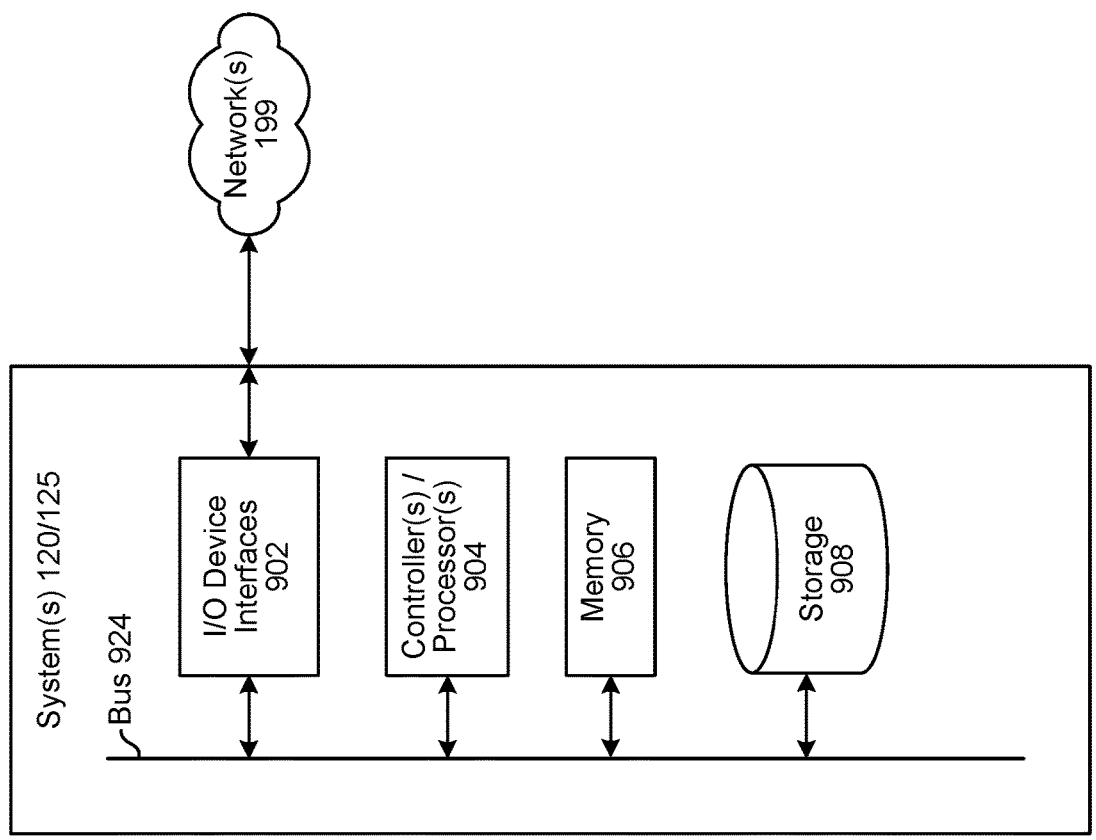
FIG. 9 is a block diagram conceptually illustrating example components of a server according to embodiments of the present disclosure.

FIG. 8 is a block diagram conceptually illustrating a device 110 that may be used with the system. FIG. 9 is a block diagram conceptually illustrating example components of a remote device, such as the system(s) 120, which may assist with ASR processing, NLU processing, etc., and the skill system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more systems 120 for performing ASR processing, one or more systems 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the system(s) 120, or the skill system(s) 125 may include their own dedicated processors, memory, and/or storage. Alternatively, one or more of the components of the device(s) 110, the system(s) 120, or the skill system(s) 125 may utilize the I/O interfaces (802/902), processor(s) (804/904), memory (806/906), and/or storage (808/908) of the device(s) 110 system(s) 120, or the skill system(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 125, as described herein, are illustrative, and may be located as a stand-alone device or may be included, in whole or in part, as a component of a larger device or system.

Figure 10:
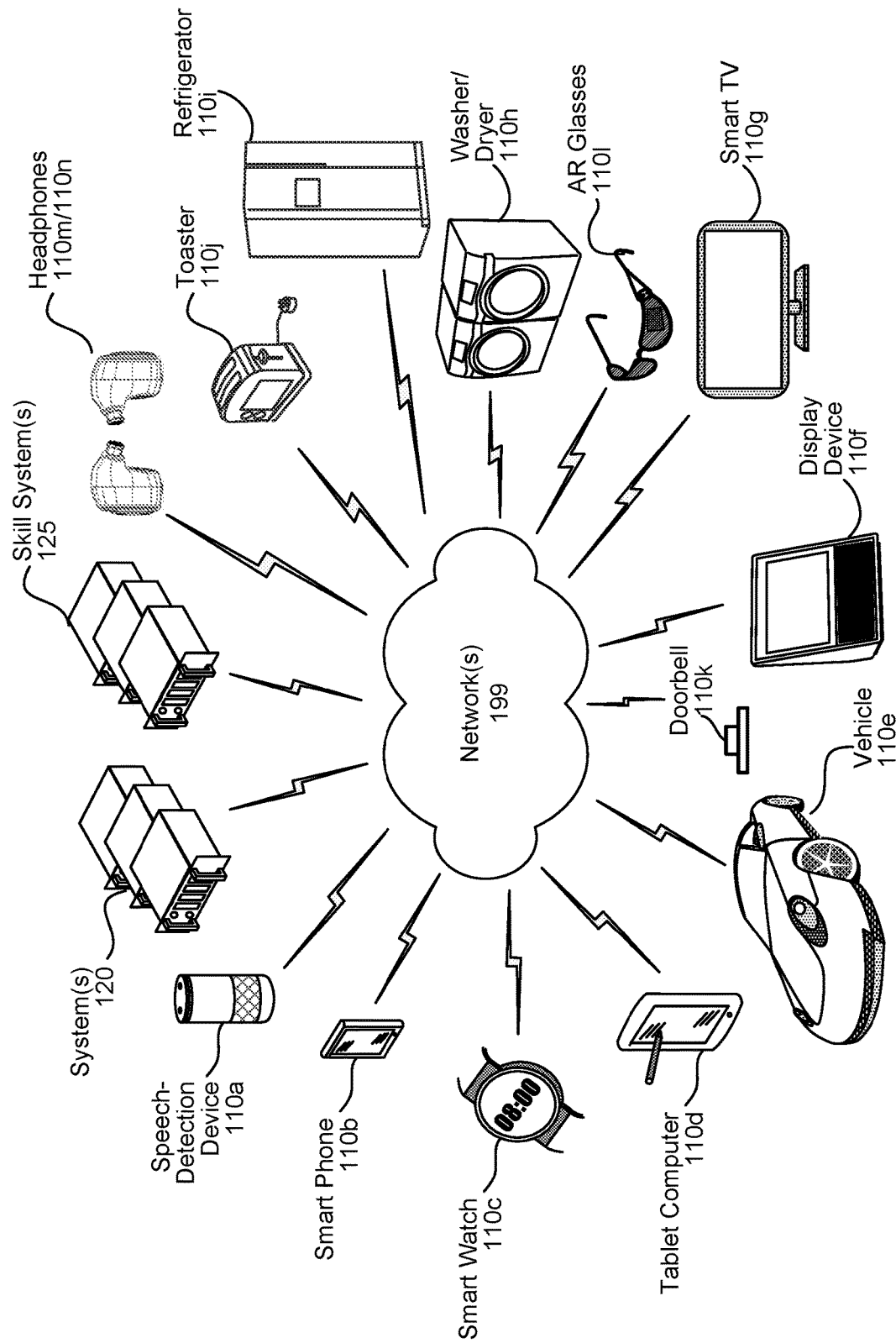
FIG. 10 illustrates an example of a computer network for use with the speech processing system.

As illustrated in FIG. 10, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, a doorbell 110k, augmented reality (AR) glasses 110l, and/or wireless headphones 110m, 110n may be connected to the network(s) 199 through a wireless service provider, over a WiFi or cellular network connection, or the like. Other devices are included as network-connected support devices, such as the system(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first user profile data corresponding to a first user profile;
   determining one or more second user profiles similar to the first user profile;
   determining historical interaction data, using second user profile data corresponding to the one or more second user profiles, the historical interaction data relating to a system within a time period;
   determining, using the historical interaction data, familiarity data for the first user profile, wherein the familiarity data represents an application familiarity corresponding to the first user profile;
   receiving, from a device, input audio data representing an utterance;
   performing speech processing on the input audio data to determine that the utterance corresponds to an application and the first user profile; and
   generating, using the familiarity data, first output data responsive to the utterance.

2. The computer-implemented method of claim 1, further comprising:
   receiving, from a system, first data representing a substantive response to the utterance; and
   determining, using the familiarity data, second data representing a descriptive format for the first data,
   wherein generating the first output data comprises generating the first output data using the first data and the second data.

3. The computer-implemented method of claim 2, further comprising:
   determining a location associated with the device; and
   determining that the utterance represents a request for information corresponding to the location,
   wherein determining the second data comprises determining that the descriptive format indicates removal of text from second output data, the text representing the location and the second output data corresponding to a past utterance.

4. The computer-implemented method of claim 1, further comprising:
   determining, using the first user profile data, a number of utterances received corresponding to the application;
   determining, based on the number of utterances, second familiarity data corresponding to the first user profile;
   receiving, from the device, second input audio data representing a second utterance;
   performing speech processing on the second input audio data to determine that the second utterance corresponds to the application;
   receiving, from a system, first data corresponding to the second utterance; and
   generating, based on the second familiarity data, second output data responsive to the second utterance, the second output data including the first output data and the first data.

5. The computer-implemented method of claim 4, further comprising:
   receiving feedback data representing user feedback with respect to the second output data;
   determining that the feedback data represents negative feedback;
   receiving, from the device, third input audio data representing a third utterance, the third utterance representing a command represented by the second utterance; and
   generating, based on the feedback data, representing negative feedback third output data responsive to the third utterance, the third output data corresponding to the first output data.

6. The computer-implemented method of claim 1, further comprising:
   determining, using the first user profile data, a total number of utterances received within the time period;
   determining a second familiarity data based on the total number of utterances, the second familiarity data representing a system familiarity corresponding to the first user profile;
   receiving, from the device, second input audio data corresponding to a second utterance;
   performing speech processing on the second input audio data to determine that the second utterance corresponds to the application; and
   generating, using the second familiarity data, second output data responsive to the second utterance.

7. The computer-implemented method of claim 1, further comprising:
   retrieving second user profile data associated with a second user profile;
   determining, using the second user profile data, a number of utterances corresponding to the application received within the time period;
   determining, based on the number of utterances, a second familiarity data representing an application familiarity corresponding to the second user profile;
   receiving, from a second device, second input audio data corresponding to a second utterance, the second utterance representing a command represented by the utterance; and
   generating, using the second familiarity data, second output data responsive to the command, the second output data being different than the first output data.

8. The computer-implemented method of claim 1, further comprising:
   determining that the familiarity data satisfies a condition;
   receiving, from a first system associated with the application, first data responsive to the utterance;
   determining, using the first user profile data, a second application; and
   receiving, from a second system associated with the second application, second data, wherein generating the first output data comprises generating the first output data including the first data and the second data.

9. The computer-implemented method of claim 1, wherein the familiarity data corresponds to a first application, and
wherein the utterance corresponds to a second application.

10. A system comprising:
at least one processor; and
at least one memory including instructions that, when executed by the at least one processor, cause the system to:
receive first user profile data corresponding to a first user profile;
determine one or more second user profiles similar to the first user profile;
determine historical interaction data, using second user profile data corresponding to the one or more second user profiles, the historical interaction data relating to a system within a time period;
determine, using the historical interaction data, familiarity data for the first user profile, wherein the familiarity data represents an application familiarity corresponding to the first user profile;
receive, from a device, input audio data representing an utterance;
perform speech processing on the input audio data to determine that the utterance corresponds to an application and the first user profile; and
generate, using the familiarity data, first output data responsive to the utterance.

11. The system of claim 10, wherein the instructions that, when executed by the at least one processor, further cause the system to:
receive, from a system, first data representing a substantive response to the utterance; and
determine, using the familiarity data, second data representing a descriptive format for the first data,
wherein the instructions that cause the system to generate the first output data further cause the system to generate the first output data using the first data and the second data.

12. The system of claim 11, wherein the instructions that, when executed by the at least one processor, further cause the system to:
determine a location associated with the device; and
determine that the utterance represents a request for information corresponding to the location,
wherein the instructions that cause the system to determine the second data further cause the system to determine that the descriptive format indicates removal of text from second output data, the text representing the location and the second output data corresponding to a past utterance.

13. The system of claim 10, wherein the instructions that, when executed by the at least one processor, further cause the system to:
determine, using the first user profile data, a number of utterances received corresponding to the application;
determine, based on the number of utterances, second familiarity data corresponding to the first user profile;
receive, from the device, second input audio data representing a second utterance;
perform speech processing on the second input audio data to determine that the second utterance corresponds to the application;

receive, from a system, first data corresponding to the second utterance; and
generate, based on the second familiarity data, second output data responsive to the second utterance, the second output data including the first output data and the first data.

14. The system of claim 13, wherein the instructions that, when executed by the at least one processor, further cause the system to:
receive feedback data representing user feedback with respect to the second output data;
determine that the feedback data represents negative feedback;
receive, from the device, third input audio data representing a third utterance, the third utterance representing a command represented by the second utterance; and
generate, based on the feedback data representing negative feedback, third output data responsive to the third utterance, the third output data corresponding to the first output data.

15. The system of claim 10, wherein the instructions that, when executed by the at least one processor, further cause the system to:
determine, using the first user profile data, a total number of utterances received within the time period;
determine a second familiarity data based on the total number of utterances, the second familiarity data representing a system familiarity corresponding to the first user profile;
receive, from the device, second input audio data corresponding to a second utterance;
perform speech processing on the second input audio data to determine that the second utterance corresponds to the application; and
generate, using the second familiarity data, second output data responsive to the second utterance.

16. The system of claim 10, wherein the instructions that, when executed by the at least one processor, further cause the system to:
retrieve second user profile data associated with a second user profile;
determine, using the second user profile data, a number of utterances relating to the application received within the time period;
determine, based on the number of utterances, second familiarity data representing an application familiarity corresponding to the second user profile;
receive, from a second device, second input audio data corresponding to a second utterance, the second utterance representing a command represented by the utterance; and
generate, using the second familiarity data, second output data responsive to the command, the second output data being different than the first output data.

17. The system of claim 10, wherein the instructions that, when executed by the at least one processor, further cause the system to:
determine that the familiarity data satisfies a condition;
receive, from a first system associated with the application, first data responsive to the utterance;
determine, using the first user profile data, a second application; and
receive, from a second system associated with the second application, second data, wherein the instructions that cause the system to generate the first output data further causes the system to generate the first output data including the first data and the second data.

* * * * *